United States Patent Office 3,371,105
METHOD FOR THE PRODUCTION OF
10-CHLOROPHENOXARSINE
Thomas W. McGee, Midland, Mich., assignor to The Dow Chemical Company, Midland, Mich., a corporation of Delaware
No Drawing. Filed Nov. 30, 1964, Ser. No. 414,900
3 Claims. (Cl. 260—440)

The present invention is concerned with an improved method for the manufacturing of 10-chlorophenoxarsine. This compound can be prepared in known procedures by reacting together diphenyloxide and arsenic trichloride in the presence of aluminum chloride as a catalyst at temperatures not in excess of 200° C. and usually at temperatures of about 170° C. Practice of such procedures provides yields which are not attractive commercially and are usually not greater than about 30–40 percent based upon the starting materials. 10-chlorophenoxarsine is useful as an antimicrobial for the control of various fungal and bacterial organisms such as *Fusarium oxysporum, lycopersici, Rhizoctonia solani, Aspergillus terreus, Pullularia pullulans* and *Erwinia carotovora*. Accordingly, it would be desirable to provide an improved and more economical method for the preparation of 10-chlorophenoxarsine which would permit the manufacture of the product in greater yields than obtainable in the known method.

The new process comprises causing diphenyloxide and arsenic trichloride to react together in the presence of aluminum chloride or aluminum bromide as a catalyst and at a temperature in the range of from 240 to 260° C. Good results are obtained when employing substantially equimolar proportions of the reactants; optimum yields being obtained in the employment of about 150 percent or greater molar excess of diphenyloxide. For optimum yields, the aluminum chloride or aluminum bromide, which serves as catalyst, is employed in molar concentrations equivalent to from about 1 to 25 percent of the molar amount of the employed arsenic trichloride. This new process gives yields greater than 60 percent and frequently as high as 80 percent based upon the employed quantity of arsenic trichloride.

In the practice of the present invention, it is critical and essential that the arsenic trichloride be added gradually, and thus reacted portionwise with the diphenyloxide at a temperature between 240 and 260° C. In the present specification and claims, the term portionwise is employed as inclusive of the concepts of multiple increment and/or a continuous stream. In such practice, the arsenic trichloride is added to the diphenyloxide and at such a rate that the temperature of the reaction mixture is at least 240° C. The aluminum chloride or aluminum bromide catalyst can be added with or at the same time as the arsenic trichloride or can be present in the diphenyloxide during the addition of the arsenic trichloride.

The reaction of the present invention takes place smoothly at temperatures of from 240 to 285° C. and preferably at temperatures of from 245 to 270° C. It is essential that the addition of the arsenic trichloride be carried out at temperatures of at least 240° C. as the addition of arsenic trichloride at temperatures below 240° C. results in a material reduction of yields of the desired product. During a portion of the reaction, the boiling temperature of the reaction mixture is about 260° C. However, as the reaction proceeds with the production of the 10-chlorophenoxarsine the boiling temperatures of the reaction mixture advances so that toward the end of the reaction the temperature of the reaction can be raised to about 285° C. To insure completion of the reaction following the addition of the arsenic trichloride, the temperature of the reaction mixture can be raised to from about 260 to 285° C. for a short period of time. Heating in excess of 285° C. for an appreciable period of time should be avoided as such operation has a deleterious effect upon the yield and purity of the desired products.

In carrying out the reaction, the arsenic trichloride is added portionwise to the mixture of diphenyl oxide and aluminum chloride or aluminum bromide at a temperature of from 240 to 260° C. In an alternative procedure, a mixture of arsenic trichloride and catalyst is added portionwise to the diphenyl oxide and under the same temperature conditions. In any event, the portionwise addition is carried out at such a rate that the temperature of the reaction mixture is maintained at from 240 to 260° C. for a short period of time. Thereafter the reaction mixture is cooled. During the cooling, the desired product precipitates as a crystalline solid. This product is separated by such conventional procedures as filtration or fractional distillation under reduced pressure.

In an alternative procedure, the present new method of manufacture can be carried out as a continuous process. In such a procedure, the arsenic trichloride is continuously metered portionwise into a stream of diphenyl oxide together with catalyst which has been heated to a temperature from 240 to 260° C. Alternatively, the mixture of arsenic trichloride and catalyst is metered with the diphenyl oxide. In any event, the metering and contacting is carried out at a temperature of from 240° to 260° C. and with continuous recycling of the reaction mixture. During the recycling, the reaction is cooled and the precipitated 10-chlorophenoxarsine removed by filtration or decantation. In an alternative method of separation, the recycling reaction mixture is subjected to fractional distillation under reduced pressure to remove 10-chlorophenoxarsine.

Example 1

Aluminum chloride (5 grams; 0.038 mole) was dispersed with stirring in diphenyloxide (340.4 grams; 2.00 mole) and the temperature of the resulting mixture elevated at 250° C. whereupon arsenic trichloride (181.3 grams; 1.00 mole) was added dropwise, with stirring, to the dispersion over a period of 5 hours. During the addition of the arsenic trichloride, the reaction mixture was heated to maintain the temperature between 245° and 250° C. Upon completion of the addition of the arsenic trichloride, the temperature of the reaction mixture was gradually raised to 260° C. over a one hour period. The reaction mixture was then allowed to cool to room temperature and the reaction flask was prepared for vacuum distillation. The vacuum distillation yielded the following results:

| Fraction | Temperature Range (° C.) | | Pressure (mm. Hg) |
|---|---|---|---|
| | Pot | Head | |
| I | 30–137 | 30–124 | 13 |
| II | 137–200 | 124–140 | 12 |
| III | 200–260 | 140–230 | 12 |

Infrared analysis of the three fractions indicated that Fraction I contained no 10-chlorophenoxarsine, Fraction II contained 6.0 grams of 10-chlorophenoxarsine and Fraction III contained 212.0 grams of 10-chlorophenoxarsine. Thus, a 78.5 percent yield of 10-chlorophenoxarsine was collected (percentage determined with respect to the amount arsenic trichloride employed).

Example 2

Aluminum chloride (5.0 grams; 0.038 mole) was dispersed with stirring in 340 grams of diphenyl oxide (2.00 moles) and the resulting dispersion heated to 250° C. Thereafter the stirring was continued and the arsenic trichloride (182 grams; 1.00 mole) was added slowly portionwise over a 5 hour period. Following the addition of the arsenic trichloride, the reaction mixture was heated to raise the temperature thereof to 280° C. Thereafter, the reaction mixture was cooled to 75° C. and a portion of the reaction mixture was removed. Infrared analysis of this portion indicated the reaction mixture was composed of 0.83 mole of 10-chlorophenoxarsine and 1.14 moles of diphenyl oxide. Following the removal of the portion for infrared analysis, the reaction mixture was further cooled to 25° C. During the latter cooling step, the 10-chlorophenoxarsine product precipitated as a crystalline solid. This crystalline solid product was separated by filtration, washed with 95 percent ethyl alcohol and dried for 3 hours at 80° C. The dried 10-chlorophenoxarsine product (219 grams; 0.785 mole) was obtained in a yield of 78.5 percent with respect to the arsenic trichloride. 10-chlorophenoxarsine melts at about 124° C.

*Example 3*

A 12 liter flask was charged with diphenyl oxide (7,670 grams; 20 moles) and aluminum chloride (120 grams; 2 moles), and the temperature of the resulting mixture raised to 250° C. with stirring. Stirring was thereafter continued and the arsenic trichloride (1,410 grams; 7.8 moles) was added gradually portionwise with heating and at such rate and under such conditions the temperature of the reaction mixture was maintained at about 246° C. throughout the addition. Upon the termination of the addition of the arsenic trichloride, the temperature of the reaction mixture was 247° C. Thereafter, the reaction mixture was allowed to cool to room temperature. During the cooling procedure, the 10-chlorophenoxarsine product precipitated in the reaction mixture as a crystalline solid.

This solid product was separated by filtration, washed with 95 percent ethanol and dried. The yield of 10-chlorophenoxarsine product was found to be 61.4 percent of the theoretical yield calculated upon the basis of the arsenic trichloride employed.

*Example 4*

Diphenyl oxide (7,670 grams; 20 moles), aluminum bromide (440 grams; 1.4 moles) are combined, allowed to react and the 10-chlorophenoxarsine product separated all exactly as described in Example 3. A 68 percent yield, based upon arsenic trichloride, of 10-chlorophenoxarsine is obtained.

I claim:
1. A method for the manufacture of 10-chlorophenoxarsine which comprises causing diphenyl oxide, arsenic trichloride and a catalyst selected from the group consisting of aluminum chloride and aluminum bromide to react at a temperature of between 240° and 285° C.
2. The method for the manufacture of 10-chlorophenoxarsine which comprises reacting arsenic trichloride gradually portionwise with diphenyl oxide in the presence of a catalyst selected from the group consisting of aluminum chloride and aluminum bromide; the reaction being effected at a temperature of from 240° to 285° C. and the arsenic trichloride being reacted portionwise at such a rate that the temperature of the reaction mixture is at least 240° C.
3. The method for the manufacture of 10-chlorophenoxarsine which comprises adding arsenic trichloride gradually portionwise to diphenyl oxide; the addition being carried out at a temperature between 240° and 260° C. and in the presence of a catalyst selected from the group consisting of aluminum chloride and aluminum bromide.

References Cited

FOREIGN PATENTS 11,632    1963    Japan.

TOBIAS E. LEVOW, *Primary Examiner.*

W. F. W. BELLAMY, *Assistant Examiner.*